United States Patent [19]
Horvath

[11] 3,734,853
[45] May 22, 1973

[54] SUCTION CLEANER FOR AQUARIUMS

[75] Inventor: Tibor Horvath, Brooklyn, N.Y.

[73] Assignee: Holvin Products Co., Inc., Brooklyn, N.Y.

[22] Filed: Oct. 4, 1971

[21] Appl. No.: 186,331

[52] U.S. Cl..................................210/169, 15/1.7
[51] Int. Cl. ...............................................E04h 3/20
[58] Field of Search...........................210/169, 241; 15/1.7

[56] References Cited

UNITED STATES PATENTS

| | | | |
|---|---|---|---|
| 3,512,646 | 5/1970 | Willinger | 210/169 |
| 3,258,801 | 7/1966 | Campbell | 15/1.7 |
| 1,101,541 | 6/1914 | Harrington | 15/1.7 |
| 1,516,359 | 11/1924 | Tideman | 210/169 X |
| 2,956,507 | 10/1960 | Hutchinson | 210/169 X |
| 3,225,930 | 12/1965 | Willinger | 210/241 |

FOREIGN PATENTS OR APPLICATIONS

| | | | |
|---|---|---|---|
| 708,284 | 5/1954 | Great Britain | 210/169 |
| 66,384 | 2/1948 | Denmark | 210/169 |

*Primary Examiner*—Samih N. Zaharna
*Assistant Examiner*—T. A. Granger
*Attorney*—Peter L. Tailer

[57] ABSTRACT

In aquarium tanks having a separate filter tank from which water is pumped from below layers of filter material into the aquarium and a syphon returning water from the aquarium to the filter tank, a suction cleaner is provided to replace or augment the syphon return, the suction cleaner having a suction arm with an upper portion grasped by the hand of a user, a flared, offset, and rotatable end to suck up debris on the bottom of the aquarium, and means to reduce and control the flow into the lower end of the arm, a syphon leg extending into the filter tank, flexible tubing connecting the suction arm and the syphon leg, and pump and valve means to start the action of the suction cleaner as a syphon. The means to reduce and control the flow into the suction arm may be a bypass opening or a valve in the arm activated to reduce flow therethrough when the arm is raised by its upper end.

9 Claims, 13 Drawing Figures

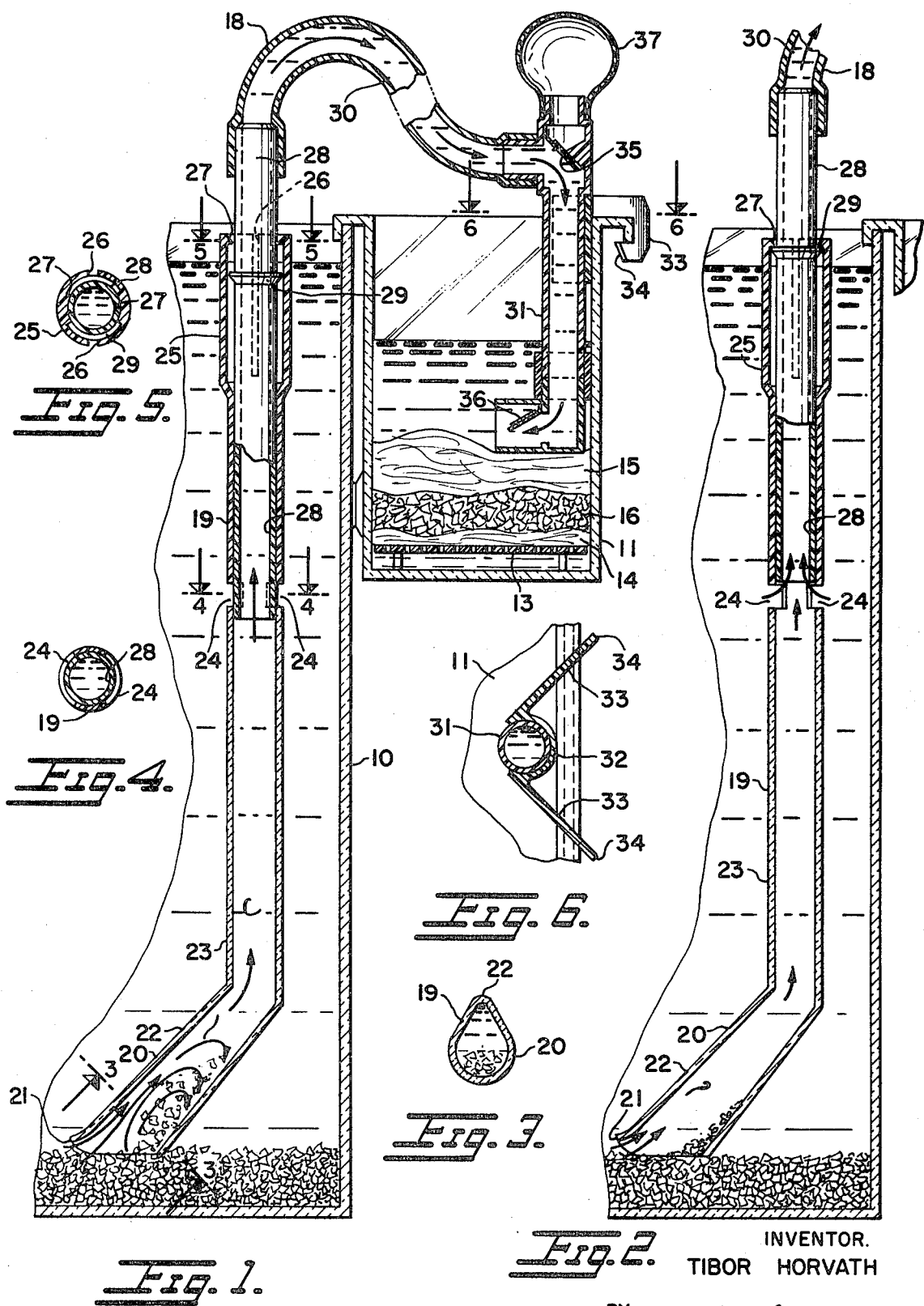

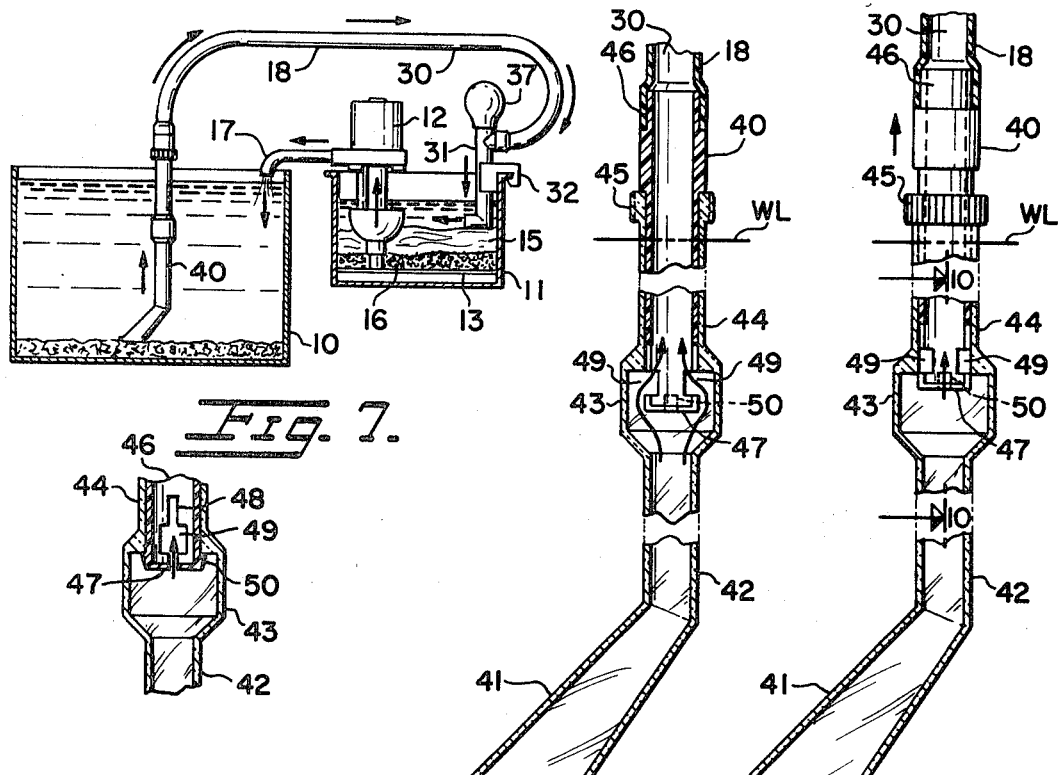
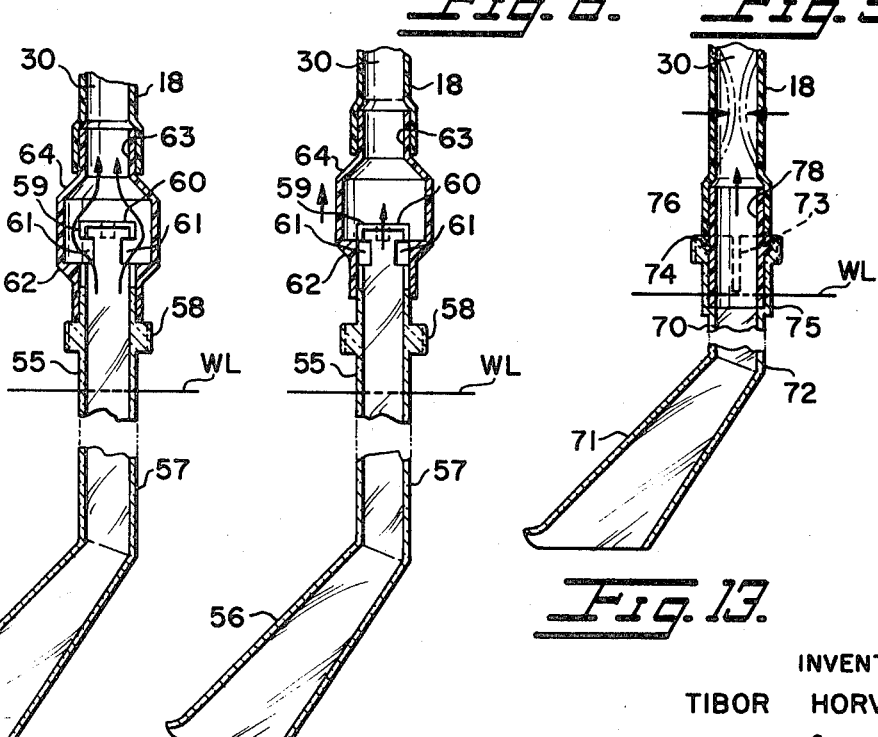

SUCTION CLEANER FOR AQUARIUMS

BACKGROUND OF THE INVENTION

Even with the best filter system, unsightly debris settles on the bottom of an aquarium tank. This invention provides a superior suction cleaner to remove such debris.

BRIEF DESCRIPTION OF THE DRAWING

FIG. 1 is a vertical section through a fragment of an aquarium tank with a filter tank attached thereto showing a suction cleaner in section positioned for use;

FIG. 2 is a vertical section through a fragment of an aquarium tank showing the suction arm of a suction cleaner therein adjusted to reduce flow therethrough;

FIGS. 3, 4, 5, and 6 are, respectively, sections taken on lines 3—3, 4—4, 5—5, and 6—6 of FIG. 1;

FIG. 7 is a vertical section through an aquarium tank, an associated filter tank, and a suction cleaner according to this invention;

FIGS. 8 and 9 are vertical sections through fragments of suction arms shown, respectively, in open and restricted flow positions according to a second embodiment of this invention;

FIG. 10 is a section taken on line 10—10 of FIG. 9;

FIGS. 11 and 12 are vertical sections through fragments of suction arms shown, respectively, in open and restricted flow positions according to a third embodiment of this invention; and FIG. 13 is a vertical section through fragments of a suction arm according to a fourth embodiment of this invention.

DESCRIPTION OF THE PREFERRED EMBODIMENTS

As shown in FIGS. 1 and 7, an aquarium tank 10 has a filter tank 11 associated with it. A pump 12 draws water from below a perforated bottom plate 13 on which rests layers 14 and 15 of filter material of a fibrous nature and an intermediate layer 16 of charcoal. Thus pump 12 draws water through the layers of filter material 14, 15 and 16 and discharges the filtered water into tank 10 through a discharge tube 17. In operation, a syphon(not shown) conducts water from the bottom of tank 10 to the filter tank 11. This syphon is either removed or its flow is augmented by the suction cleaner of this invention.

As may be seen in FIGS. 1–6, the first embodiment of the suction cleaner functions as a syphon drawing water and debris from the bottom of tank 10 so that the debris will be removed in filter tank 11. The suction cleaner 18 has a long suction arm 19 with an offset lower inlet end 20. End 20 has a raised front lip 21 formed by the end of a raised, more curved upper wall portion 22 of end 20. The inclined or offset end 20 may be thrust under overhanging objects to completely remove all debris from the bottom of tank 10.

End 20 is integrally formed with tubular shank 23 which contains the inlet ports 24 cut in about its center. The upper end of shank 23 terminates in the larger diameter upper end 25 containing the longitudinal splits 26 and inward facing hooks 27 therebetween. Slidably extending downward into the larger diameter upper end 25 is tube 28 having a collar 29. Tube 28 extends downward below the ports 24 and collar 29 is slidably disposed below hooks 27 within upper end 25. Thus it may be seen that tube 28 may rotate and slide within arm 19 so that in a lower position it blocks the inlet ports 24 as shown in FIG. 1 and in a raised position it opens them as shown in FIG. 2. Collar 29 springs hooks 27 outward in assembly and limits the withdrawal of tube 28 in operation.

Flexible tubing 30 is forced over tube 28 to connect suction arm 19 to syphon leg 31 in filter tank 11. As shown in FIG. 6, leg 31 has a bracket 32 forced about it. Bracket 32 has arms 33 terminating in hooks 34 which secure leg 31 in place.

Leg 31 contains the upper and lower flap valves 35 and 36. Between the valves 35 and 36 starter bulb 37 communicates so that squeezing of bulb 37 provides a pump action to fill suction cleaner 18 and start its syphoning. As water flows through suction cleaner 18, it may be held by tube 28 and its offset end 20 directed by rotating the larger diameter upper end 25 of shank 23. End 25 extends above the water level of tank 10 so it is easily turned. If gravel is drawn up leg 19 as shown in FIG. 1, the raising of tube 28 opens the inlet ports 24, as shown in FIG. 2, to reduce flow in end 20. The reduced flow lets gravel fall back to the bottom of tank 10 while lighter debris continues to be carried to filter tank 11.

FIGS. 8, 9, and 10 show a second embodiment of this invention having a suction arm 40 terminating in an offset lower end 41. Integrally formed with lower end 41 is a shaft 42 having an enlarged center 43 and a smaller diameter upper portion 44 having a knurled flange 45. Flexible tubing of the suction cleaner 18 is forced over the upper end of control tube 46 which extends slidably and rotatably into the larger diameter upper portion 44. Control tube 46 terminates in an end wall 47 and contains the longitudinal split 48 which is widened to form the lateral ports 49. Laterally extending hooks 50, shown in FIG. 10, compress split 48 in assembly and then spring out to limit the upward movement of control tube 46 within the upper portion 44. Thus raising of the control tube 46 closes ports 49 to restrict flow. Lower end 41 is rotated by flange 45.

FIGS. 11 and 12 show a third embodiment of this invention having a suction arm 55 terminating in an offset lower end 56. Integrally formed with lower end 56 is a shaft 57 having a knurled turning flange 58 formed thereon so as to be disposed above the aquarium tank 10 water level designated WL. Above flange 58 shaft 57 terminates in an upper end wall 60 containing the vertical split 59 which is widened below wall 60 to form the ports 61. A hand held member 62 has flexible tubing 30 forced over its upper end 63 and it has a lower enlarged portion 64 into which the upper end of shaft 57 extends. It is to be noted that the valving action or the closing of the ports 49 and 61 of the second and third embodiments of this invention are the same except that the third embodiment is inverted compared to the second. FIG. 11 shows the ports 61 open and FIG. 12 shows the ports 61 closed by raising the hand held member 62. Hooks(not shown) similar to those shown in FIG. 10 secure the shaft 57 rotatably and slidably within portion 62. The portion 62 may be held with one hand as the offset lower end 56 is rotated by fingers of that hand contacting the turning flange 58.

FIG. 13 shows a fourth embodiment of this invention in which a suction arm 70 has an offset lower end 71. Integrally formed with lower end 71 is a shaft 72 which terminates in a larger diameter upper end 75 containing the vertical splits 73 and an internal annular groove 74. On top of end 75 is a knurled rotating flange 76. An upper tube 78 has a circumferential ridge which is forced within groove 74. Flexible tubing 30 is forced over the upper end of tube 78 allowing the suction arm 70 to be held by tube 30 and rotated by means of rotating flange 76. Flow is controlled by pinching tube 18 as indicated by phantom lines.

The suction cleaning device of this invention is best fabricated from transparent plastic. When gravel is observed being drawn up in a lower end 20, 41, or 56, a natural response is to raise the hand holding the suction arm. This automatically reduces flow in the lower end to drop the gravel.

While this invention has been shown in the best forms known, it will nevertheless be understood that these are purely exemplary and modifications may be made without departing from the spirit of the invention.

I Claim:

1. For use with an aquarium tank, and associated filter tank having layers of filter material therein, a circulating pump drawing water from below the filter material and returning it to said aquarium tank, and means enabling water to flow from said aquarium tank into said filter tank; a suction cleaner for said aquarium tank syphoning debris from the bottom of said aquarium tank and depositing it above the layers of filter material in said filter tank, said suction cleaner comprising, in combination, a syphon, an inlet of said syphon having a suction arm having an upper end adapted to be held by the hand of a user and a lower end reaching the bottom of said aquarium tank, an outlet of said syphon having a syphon leg extending downward into said filter tank and having an upper end, flexible tubing connecting said upper end of said syphon leg and said upper end of said suction arm, and suction pump means associated with said syphon leg drawing water into said suction cleaner to start a syphon flow therethrough.

2. The combination according to claim 1 wherein said suction pump means associated with said syphon leg comprises check valves in said syphon leg and a resilient bulb communicating between said check valves so that squeezing and releasing said bulb draws water into said suction cleaner starting a syphon flow therethrough.

3. The combination according to claim 2 wherein said suction arm has an offset lower end extending downward at an angle, a tube extending upward from said lower end, and a hand held portion to which said tube is rotatably connected, said tube having a portion adapted to be turned by the fingers of a user to rotate and direct said lower end.

4. The combination according to claim 3 wherein said hand held portion has a tubular lower end and said tube has an enlarged upper end disposed about the lower end of said hand held portion, said portion of said tube adapted to be turned by the fingers of a user being a turning flange formed at the upper end of said tube, said flexible tubing being pinched by the hand of a user to restrict flow therethrough, and with the addition of means rotatably securing said lower end of said hand held portion within said upper end of said tube.

5. The combination according to claim 4 wherein said means securing said lower end of said hand held portion within said upper end of said tube comprises a circumferential ridge on said lower end of said hand held portion, said upper end of said tube containing an internal annular groove and a longitudinal split extending below said annular groove, said circumferential ridge seating within said annular groove.

6. The combination according to claim 3 wherein said tube is a first tube having a larger diameter upper end containing vertical splits and having inward facing hooks, and wherein said hand held portion is a second tube having a collar thereon, said second tube slidably entering said first tube with said collar being retained in the larger diameter upper end of said first tube by said hooks, said first tube containing lateral ports and said second tube extending past said lateral ports blocking said lateral ports until said second tube is raised sliding upward uncovering said lateral ports, said larger diameter upper end being said portion adapted to be turned by the fingers of a user.

7. The combination according to claim 3 wherein said tube is a first tube having an enlarged center and an upper portion, said upper portion terminating in a rotating flange, said rotating flange being said portion adapted to be turned by the fingers of a user, said hand held portion being a second tube extending downward through said upper portion into said enlarged center, said second tube terminating in an end wall containing a split extending upward in said second tube, said split having widened portions forming ports above said end wall, said second tube having lateral hooks on each side of said split preventing the withdrawal of said second tube from said enlarged center, raising said second tube sliding it upward in said upper portion of said first tube blocking said ports to reduce flow.

8. The combination according to claim 3 wherein said tube terminates in an upper end wall containing a split extending downward in said tube, said split having widened portions forming ports below said end wall, said tube having a rotating flange disposed below said split, said rotating flange being said portion adapted to be turned by the fingers of a user, said hand held portion having a lower enlarged portion receiving the upper end of said tube, said tube having lateral hooks on each side of said split preventing the withdrawal of said tube from said enlarged portion, raising said hand held portion drawing it upward about said tube blocking said ports to reduce flow.

9. The combination according to claim 3 wherein said lower end of said suction arm is tear drop in section with a more curved upper wall portion and a rounded lower wall portion, said lower end having a horizontal bottom with a raised front lip formed by the lower end of said more curved upper wall portion.

* * * * *